(12) United States Patent
Mo et al.

(10) Patent No.: US 11,544,373 B2
(45) Date of Patent: Jan. 3, 2023

(54) METHOD AND SYSTEM FOR APPLICATION SECURITY

(71) Applicants: Zhijun Mo, Waterloo (CA); Yin Tan, Waterloo (CA); Mikhail Kazaev, Waterloo (CA)

(72) Inventors: Zhijun Mo, Waterloo (CA); Yin Tan, Waterloo (CA); Mikhail Kazaev, Waterloo (CA)

(73) Assignee: Huawei Technologies Co., Ltd., Shenzhen (CN)

(*) Notice: Subject to any disclaimer, the term of this patent is extended or adjusted under 35 U.S.C. 154(b) by 222 days.

(21) Appl. No.: 17/127,793

(22) Filed: Dec. 18, 2020

(65) Prior Publication Data

US 2022/0197999 A1    Jun. 23, 2022

(51) Int. Cl.
     *G06F 21/54*      (2013.01)
     *G06F 21/53*      (2013.01)
     *G06F 21/60*      (2013.01)
     *G06F 21/31*      (2013.01)

(52) U.S. Cl.
CPC .............. *G06F 21/54* (2013.01); *G06F 21/31* (2013.01); *G06F 21/53* (2013.01); *G06F 21/602* (2013.01); *G06F 21/604* (2013.01)

(58) Field of Classification Search
CPC .......... G06F 21/54; G06F 21/31; G06F 21/53; G06F 21/602; G06F 21/604
See application file for complete search history.

(56) References Cited

U.S. PATENT DOCUMENTS

| | | | |
|---|---|---|---|
| 2005/0138354 A1 | 6/2005 | Saltz | |
| 2006/0075473 A1* | 4/2006 | Moreh | H04L 63/205 726/5 |
| 2009/0125974 A1* | 5/2009 | Zhang | G06F 21/604 726/1 |
| 2013/0097654 A1* | 4/2013 | Aciicmez | G06F 21/10 726/1 |
| 2018/0336590 A1* | 11/2018 | Schobeiri | G06Q 30/0257 |

FOREIGN PATENT DOCUMENTS

| | | |
|---|---|---|
| CN | 111580820 A | 8/2020 |
| CN | 111782300 A | 10/2020 |
| CN | 111881387 A | 11/2020 |

\* cited by examiner

*Primary Examiner* — Ayoub Alata

(57) ABSTRACT

A method and system for application security. The methods and systems of the present disclosure improve application security and may be used to secure a host application and operating system from malicious fast applications. A request to access resources of the computing device is received from an application adapter of a fast application operating within a host application on the computing device. In response to a determination that the request is associated with resources included in a permission list of the fast application, the unique user identifier (UID) of the application adapter to the UID of the host application is translated by the operating system, which determines whether to allow the request based on the UID of the host application. Otherwise, the operating system determines whether to allow the request based on the UID of the application adapter.

20 Claims, 7 Drawing Sheets

METHOD AND SYSTEM FOR APPLICATION SECURITY

RELATED APPLICATIONS

This is the first application filed for the instantly disclosed technology.

TECHNICAL FIELD

The present disclosure relates to application security, and more specifically, to a method and system for application security.

BACKGROUND

Application security is an important aspect of modern computing. An application on a computing device presents a security risk for hacking, viruses, malware and the like. Fast applications (also referred to as mini-applications, mini-programs and Web-applications) are one type of application that may operate on a computing device such as a smartphone. Fast applications are typically JavaScript-based, lightweight applications designed to run within another application referred as a host application. The host application may be any suitable type of application including a social application, a messaging application, a Web browser, a game, or a launcher application of the operating system of the computing device. Fast applications provide alternative application ecosystems for a host computing device in addition to the native application ecosystem. An application ecosystem is a collection of applications that share application code. The applications within an application ecosystem typically have a hierarchical relationship based on the inheritance or dependence of the shared application code with the host application and possibly other fast applications.

Fast applications provide the benefits of rapid development, fast deployment and ease of use, and have become increasingly popular in recent years in ecommerce, social media, entertainment and other areas. Fast applications are commonly used as means for mini-games, in-app purchases, and in-app digital rewards (commonly linked to in-app advertising). However, fast applications present critical security threats due to a lack of regulation and the vast attack surface that persists in most JavaScript engines. Users may suffer significant loss by allowing malicious fast applications to run freely on their computing devices with no boundaries or checks. For at least these reasons, there is a need for methods and systems that improve application security.

SUMMARY

The present disclosure provides method and system for application security. The methods and systems of the present disclosure improve application security and may be used to secure a host application and operating system from malicious fast applications. The methods and systems of the present disclosure address at least two security issues associated with fast applications: weak boundaries and lack of prior checks.

The methods and systems of the present disclosure aim to improve the security of the fast application runtime by bringing in additional defensive measures to contain the untrusted fast application code to mitigate damage under attacks and to detect malicious fast applications before the attacks. The solution presented by the methods and systems of the present disclosure uses one or a combination of three features: a user identifier (UID) isolation, a privilege-less JavaScript engine sandboxing isolation, and a JavaScript Integrity Measurement Agent (JIMA). The UID isolation enforces an operating system (OS) level separation between a JavaScript engine adapter of the fast application and the host application. A privilege-less application sandbox further isolates the JavaScript engine. Together, these features create stronger barriers to prevent malicious fast applications from gaining the same set of permissions as the host application. The JIMA periodically measures the integrity of the fast application code to ensure that remains unchanged since installation and throughout execution.

Fast applications are configured to run within host applications and access resources, such as user data, hardware, file systems, key configuration data and cryptographic materials, etc., accessible to the host applications. The access by the fast applications to resources on the host computing device is controlled by the JavaScript engine and role-based access control (RBAC) enforced by the underlying JavaScript engine adapter which supports platform-dependent features of the JavaScript engine. A JavaScript engine adapter is an application programming interface (API) translates one interface (e.g., an object's properties and methods) to another, such an object-centric API to enable object real-time communications. Each fast application has one corresponding JavaScript engine instance and one JavaScript engine adapter instance.

Reference with now be made to FIG. 1, which is a block diagram illustrating software architecture in accordance with the prior art, to explain how a malicious fast application 62 can be used to commit an attack against a computing device 102 via a host application 60 in accordance with the prior art. The host application 60 has a logical boundary, referred as an application boundary 20, enforced by the operating system 150 which separates it from the other applications 158 of the computing device 102. Within the application boundary 20 resides the host application 60, JavaScript (JS) Engine 54, JavaScript (JS) Engine Adapter 56, the fast application 62. Fast applications, such as the malicious fast application 62, typically operate within a weak logical boundary 30 within the application boundary 20 of the host application 60.

The JavaScript engine has a vast attack surface and is vulnerable to attacks, such as arbitrary RAM reads/writes, due to its complexity in design. Thus, the JavaScript engine may contain untrusted fast application code within a weak boundary. The JavaScript engine adapter typically resides in the same process space as the JavaScript engine and the host application. After malicious code (e.g., malicious script) of a malicious fast application breaks out of containment from the JavaScript engine, the malicious script can manipulate the JavaScript engine adapter to subvert any checks that it enforces, such as forging permissions that the user did not grant, and acquire the same set of privileges and permissions as the host application. The host application may be granted privileges and permissions to access a wide variety of resources to support a wide variety of fast applications. Therefore, there is a security risk that the many privileges and permissions as the host application and access to resources granted to the host application, may be acquired by the malicious script of a malicious fast application. One objective of the present disclosure is to mitigate the damage in the event of an attack to contain the malicious code from reaching the host application.

Conventionally, fast applications are launched and run without any prior checks. JavaScript is susceptible to tamper as it is more readable than binary code, thus easier to modify by attackers. In addition, due to the flexibility of the JavaScript language, it is possible to construct a self-morphing code that automatically changes part of itself at runtime. This dynamic behaviour is undetectable by static analysis. Therefore, attackers can create self-morphing fast applications that can go undetected by malware analysis software deployed on fast application store servers, deceiving the user to download them as seemingly legitimate applications. At runtime, the attacker can remotely trigger the application to morph, to perform phishing attacks or to attack devices through privilege escalation. One of the objectives of the present disclosure is to prevent such fast applications from running further after a change in code has been detected. This may be achieved, for example, by notifying the user of the attack so that the malicious fast application can be safely removed.

In accordance with a first embodiment of a first aspect of the present disclosure, there is provided a method for enforcing application security on a computing device. The method comprises receiving, by an operating system of the computing device from an application adapter of a fast application operating within a host application on the computing device, a request to access resources of the computing device. The host application and application adapter are each associated with a unique user identifier (UID). In response to a determination that the request is associated with resources included in a permission list of the fast application, the operating system translates the UID of the application adapter to the UID of the host application and determines whether to allow the request based on the UID of the host application. In response to a determination that the request is associated with resources not included in the permission list of the fast application, the request is associated with a key management service, or the request is associated with a file system, the operating system refrains from translating the UID of the application adapter to the UID of the host application, and determines whether to allow the request based on the UID of the application adapter.

In some or all examples of the first embodiment of the first aspect, the method further comprises performing the request in response to a determination to allow the request.

In some or all examples of the first embodiment of the first aspect, the fast application and scripting engine for executing the fast application are operated within a privilege-less application sandbox, wherein access to resources of the computing device outside of the privilege-less application sandbox are controlled by the application adapter.

In some or all examples of the first embodiment of the first aspect the privilege-less application sandbox provides a runtime environment in which access to resources of the computing device outside of the privilege-less application sandbox are controlled by the application adapter through a two-way channel.

In some or all examples of the first embodiment of the first aspect, wherein the fast application is a JavaScript application, the scripting engine is a JavaScript engine, and the application adapter is a JavaScript engine adapter.

In some or all examples of the first embodiment of the first aspect, the method further comprises: before operating the fast application, loading a reference fast application within a reference privilege-less application sandbox and obtaining a complied bytecode of the reference fast application, generating cryptographic signatures for dividable sections of bytecode of the reference fast application using a cryptographic hash function, wherein a cryptographic signature is generated for each of the dividable sections of the compiled bytecode of the reference fast application, and storing the cryptographic signatures in a signature cache; and periodically during the operating the fast application, generating a cryptographic signature of each dividable section of the bytecode of the fast application at runtime, determining whether the cryptographic signatures of the bytecode of the fast application at runtime matches the cryptographic signatures of the bytecode of the reference fast application stored in the signature cache, and performing a security action in response to determination of a mismatch between the cryptographic signatures of the bytecode of the fast application at runtime and the cryptographic signatures of the bytecode of the reference fast application stored in the signature cache.

In some or all examples of the first embodiment of the first aspect, the security action comprises terminating the fast application.

In some or all examples of the first embodiment of the first aspect, the security action comprises generating user notification.

In some or all examples of the first embodiment of the first aspect, the user notification is an onscreen notification displayed on a display of the computing device.

In some or all examples of the first embodiment of the first aspect, wherein the onscreen notification is part of, or overlays, a visual interface screen of the host application in which the fast application operates.

In some or all examples of the first embodiment of the first aspect, each UID is associated with a set of permissions to access resources of the computing device, wherein the UID of the host application is granted more permissions than the UID of the application adapter.

In accordance with a second embodiment of a first aspect of the present disclosure, there is provided a method for enforcing application security on a computing device. Before operating a fast application operating within a host application on computing device, a reference fast application is loaded within a reference privilege-less application sandbox and obtaining a complied bytecode of the reference fast application, cryptographic signatures for dividable sections of bytecode of the reference fast application using a cryptographic hash function, wherein a cryptographic signature is generated for each of the dividable sections of the compiled bytecode of the reference fast application, and the cryptographic signatures are stored in a signature cache. Periodically during the operating the fast application, cryptographic signatures for dividable sections of the bytecode of the fast application at runtime using the cryptographic hash function, wherein a cryptographic signature is generated for each of the dividable sections of the bytecode of the fast application at runtime, it is determined whether the cryptographic signatures of the bytecode of the fast application at runtime matches the cryptographic signatures of the bytecode of the reference fast application stored in the signature cache, and a security action is performed in response to determination of a mismatch between the cryptographic signatures of the bytecode of the fast application at runtime and the cryptographic signatures of the bytecode of the reference fast application stored in the signature cache.

In some or all examples of the second embodiment of the first aspect, the fast application and scripting engine for executing the fast application are operated within a privilege-less application sandbox, wherein access to resources of the computing device outside of the privilege-less application sandbox are controlled by the application adapter.

In some or all examples of the second embodiment of the first aspect, the security action comprises terminating the fast application.

In some or all examples of the second embodiment of the first aspect, the security action comprises generating user notification.

In accordance with another aspect of the present disclosure, there is provided a computing device comprising a processor and a memory. The memory having tangibly stored thereon executable instructions for execution by the processor. The executable instructions, in response to execution by the processor, cause the computing device to perform the methods described above and herein. In a first embodiment, the processor is configured to: receive, by an operating system of the computing device from an application adapter of a fast application operating within a host application on the computing device, a request to access resources of the computing device. The host application and application adapter are each associated with a unique user identifier (UID). In response to a determination that the request is associated with resources included in a permission list of the fast application, the operating system translates the UID of the application adapter to the UID of the host application and determines whether to allow the request based on the UID of the host application. In response to a determination that the request is associated with resources not included in the permission list of the fast application, the request is associated with a key management service, or the request is associated with a file system, the operating system refrains from translating the UID of the application adapter to the UID of the host application, and determines whether to allow the request based on the UID of the application adapter.

In accordance with a further aspect of the present disclosure, there is provided a non-transitory machine readable medium having tangibly stored thereon executable instructions for execution by a processor of a computing device. The executable instructions, in response to execution by the processor, cause the computing device to perform the methods described above and herein. In a first embodiment, the executable instructions, in response to execution by the processor, cause the computing device to: receive, by an operating system of the computing device from an application adapter of a fast application operating within a host application on the computing device, a request to access resources of the computing device. The host application and application adapter are each associated with a unique user identifier (UID). In response to a determination that the request is associated with resources included in a permission list of the fast application, the operating system translates the UID of the application adapter to the UID of the host application and determines whether to allow the request based on the UID of the host application. In response to a determination that the request is associated with resources not included in the permission list of the fast application, the request is associated with a key management service, or the request is associated with a file system, the operating system refrains from translating the UID of the application adapter to the UID of the host application, and determines whether to allow the request based on the UID of the application adapter.

Other aspects and features of the present disclosure will become apparent to those of ordinary skill in the art upon review of the following description of specific implementations of the application in conjunction with the accompanying figures.

DETAILED DESCRIPTION OF EXAMPLE EMBODIMENTS

Figure 1:
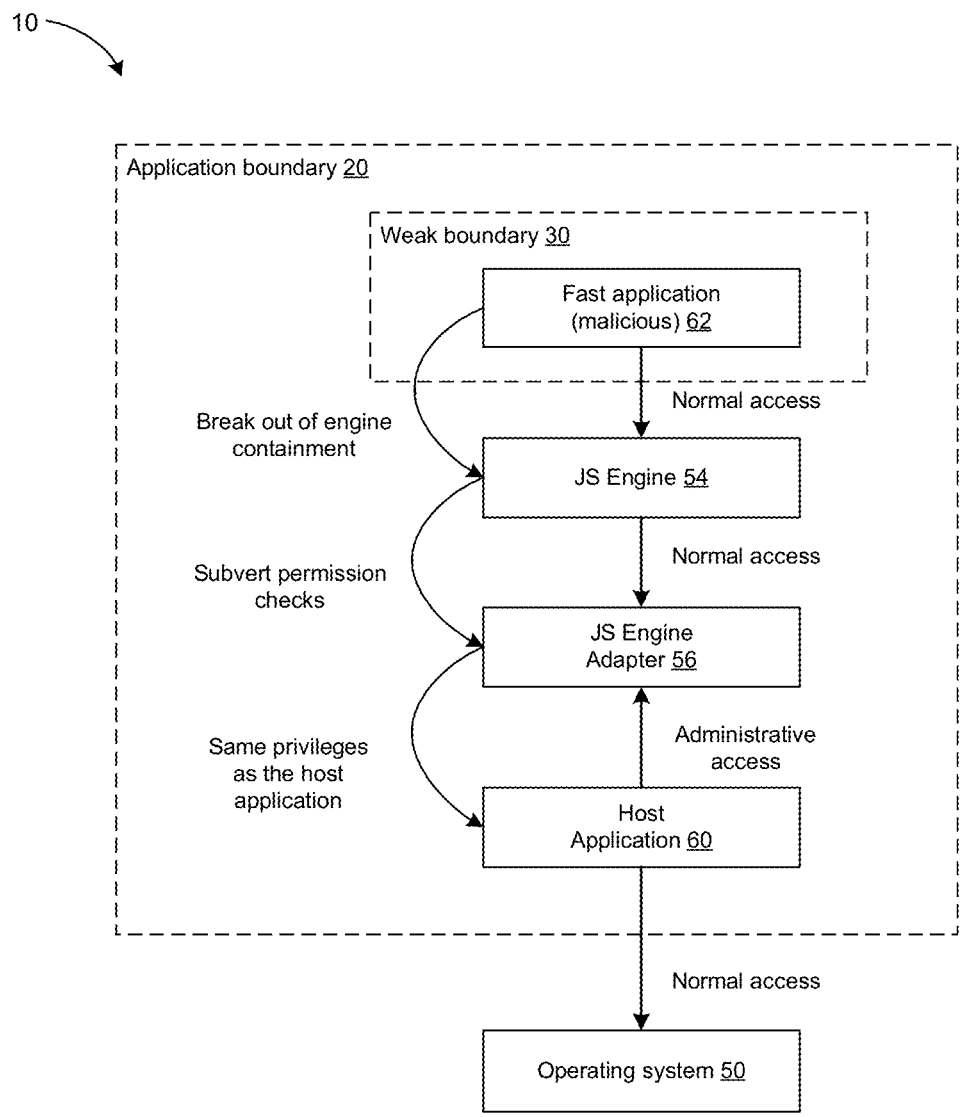
FIG. 1 is a block diagram illustrating software architecture in accordance with the prior art.
Figure 2:
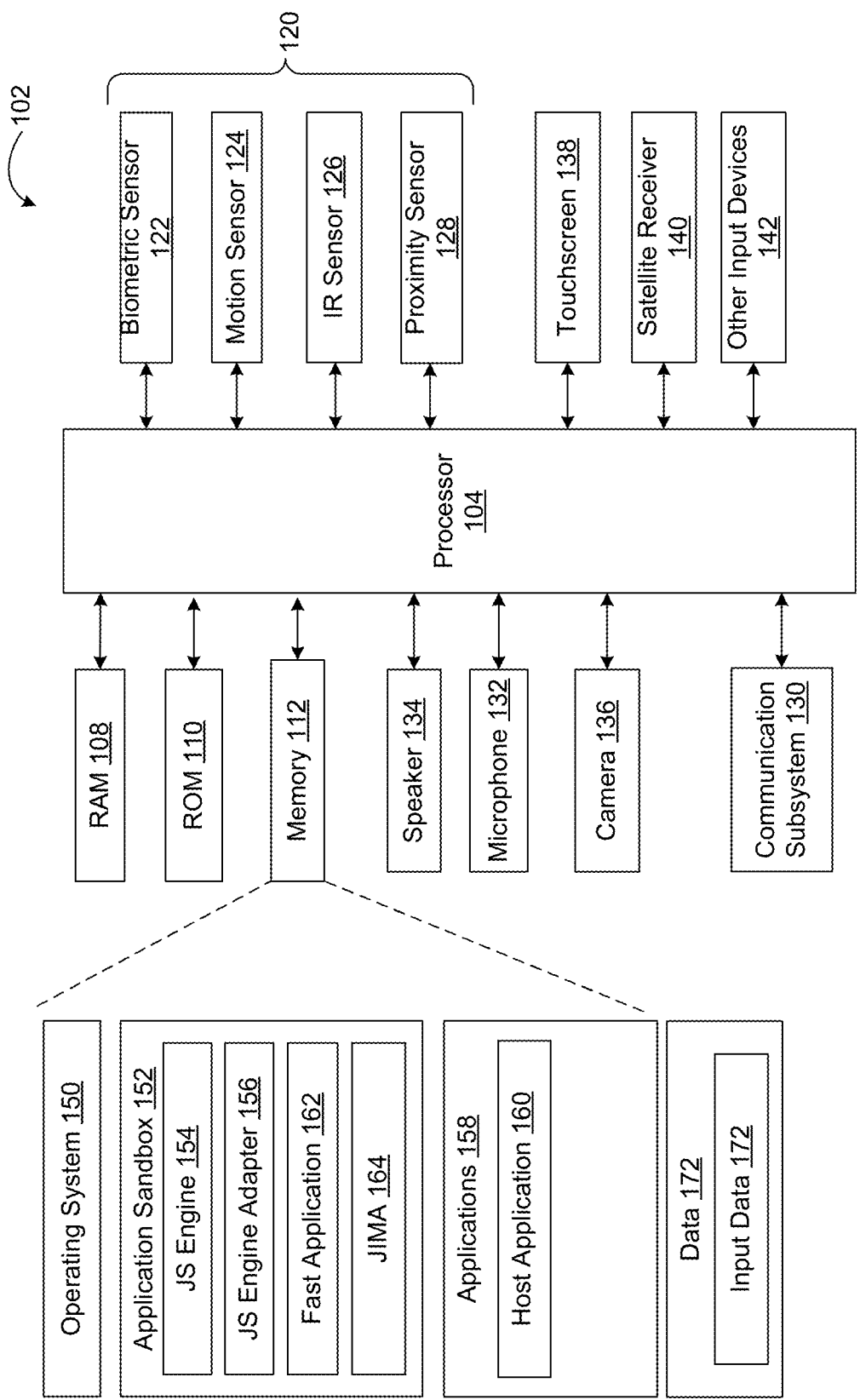
FIG. 2 is a block diagram of an example computing device suitable for practicing the teachings of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

Reference is first made to FIG. 1 which illustrates a computing device 102 suitable for practicing the teachings of the present disclosure. The computing device 102 may be a multi-purpose communication device such as a wired or wireless communication device. Examples of the computing device 102 include, but are not limited to, a smartphone, tablet, a personal camera or camera peripheral, a personal computer such as a desktop or laptop computer, smart glasses or other head device mounted display, a smart speaker or other smart or IoT (Internet of Things) device such as a smart appliance, among other possibilities. Alternatively, the computing device 102 may be a server, an access point (AP) or a computing system. FIG. 1 shows a single instance of each component. However, there may be multiple instances of each component in the computing device 102 and it could be implemented using parallel and/or distributed architecture.

The computing device 102 includes a processing system comprising a processor 104 (such as a microprocessor or central processing unit (CPU)) which controls the overall operation of the computing device 102. The processing system may include one or more other types of processors coupled to the processor 104, such as a graphic processing unit (GPU), a tensor processing unit (TPU), a neural processing unit (NPU), an application specific integrated circuit, or a field programmable gate array (FPGA), for off-loading certain computing tasks. The processor 104 is coupled to a plurality of components via a communication bus (not shown) which provides a communication path between the components and the processor 104. The processor 104 is coupled to Random Access Memory (RAM) 108, Read Only Memory (ROM) 110, and persistent (non-volatile) memory 112 such as flash memory and a communication subsystem 130. The communication subsystem 130 includes one or more wireless transceivers for exchanging radio frequency signals with wireless networks. The communication subsystem 130 may also include a wireline transceiver for wireline communications with wired networks. The wireless transceivers may include one or a combination of Bluetooth transceiver or other short-range wireless transceiver, a Wi-Fi or other wireless local area network (WLAN) transceiver for communicating with a WLAN via a WLAN access point (AP), or a wireless wide area network (WWAN) transceiver such as a cellular transceiver for communicating with a radio access network (e.g., cellular network). The cellular transceiver may communicate with any one of a plurality of fixed transceiver base stations of the cellular network within its geographic coverage area. The wireless transceivers may include a multi-band cellular transceiver that supports multiple radio frequency bands. Other types of short-range wireless communication include near field communication (NFC), IEEE 802.15.3a (also referred to as UltraWideband (UWB)), Z-Wave, ZigBee, ANT/ANT+ or infrared (e.g., Infrared Data Association (IrDA) communication). The wireless transceivers may include a satellite receiver for receiving satellite signals from a satellite network that includes a plurality of satellites which are part of a global or regional satellite navigation system.

The computing device 102 may also comprise a microphone 132 and a speaker 134 coupled to the processor 104. The computing device 102 may also comprise a camera 136, a touchscreen 138, and a satellite receiver 140 for receiving satellite signals from a satellite network, depending on the type of the computing device 102. The touchscreen 138 is typically a capacitive touchscreen. The computing device 102 may also comprise a plurality of sensors 120 coupled to the processor 104. The sensors 120 may comprise a biometric sensor 122 such as face scanner or finger print scanner, a motion sensor 124 such as an accelerometer, an infrared (IR) sensor 126, and/or a proximity sensor 128. The sensors 120 may include other sensors (not shown) such as an orientation sensor, electronic compass or altimeter, among possible embodiments. The computing device 102 may also comprise one or more other input devices 142 such as buttons, switches, dials, a keyboard or keypad, or navigation tool, depending on the type of the computing device 102.

The memory 112 stores software executable by the processing system to provide an operating system 150 such as Android™, a privilege-less application sandbox 152 which comprises a scripting engine such as a JavaScript (JS) Engine 154, for example, the V8 open-source JavaScript engine developed by The Chromium Project, and applications 158. The privilege-less application sandbox 152 is a special restricted process executed with minimal privileges as to isolate sandbox content from the rest of the system, described more fully below.

The operating system 150 provides a visual user interface (VUI) for user interaction with the computing device 102 in the form of touch inputs detected via the touchscreen 138 and/or other input devices 142. The application 158 comprise at least one host application 160, at least one fast application 162 for execution within the host application 160, and a scripting language integrity measurement agent such as a JavaScript Integrity Measurement Agent (JIMA) 164. The host application 160 provides a fast application framework that can launch one or more fast applications 162. An application adapter, such as a JavaScript (JS) Engine Adapter 156, is provided for each fast application 162. The JS Engine Adapter 156 provides an application programming interface (API) that allows the fast application 162 to access various services of the operating system 150, such as storage, camera, keystore, etc. The JS Engine Adapter 156 may run as a part of host application process, and any requests by the fast application 162 to access operating system services must be routed through IPC with the host application process. Alternatively, the fast application 162 have its own JS engine adapter 156 that would interact with the operating system 150.

Examples of the host application 160 include a social media application, messaging application, a Web browser, a game, or a launcher application of the operating system 110. The memory 112 stores the fast application 162 in bytecode for processing by the JavaScript Engine 154. The host application 160 can be written in a variety of programming languages.

The operating system 150 controls inter-process communication (IPC) between processes (e.g., software components or applications 152) and the various hardware components) of the computing device 102. The operating system 150 provides IPC communication mechanism between the fast application framework and processes operating within the privilege-less application sandbox 152 (referred to as sandbox processes). The operating system 150 also grants and denies permissions to applications 152, such as the host application 160 and the fast application 162, to access resources of the computing device 102. As noted above, fast applications 162 are JavaScript-based, lightweight applications designed to run within a host application 160. The fast application 162 is a smaller and faster application than the host application 160 and resides within the host application boundary.

The JIMA 164 is controlled by the operating system 150. Alternatively, the JIMA 164 may be part of the operating system 150. The JIMA 164 makes a copy of the bytecode of a fast application 162 before the first launch of the fast application 162. The JIMA 164 computes a cryptographic signature of each bytecode section using a cryptographic hash function and stores the cryptographic signature in the memory 112. When the fast application 162 is running, the JIMA 164 periodically generates cryptographic signatures of bytecode sections the fast application 162 a reference fast application running in an isolation sandbox and compares the generated cryptographic signatures against the stored cryptographic signatures to identify any mismatches. A mismatch implies that the code of the fast application 162 has changed since it was installed, which is an indication that the fast application 162 may be malicious. In response to detection of a mismatch, the JIMA 164 may send a request to the operating system 150 to terminate the corresponding fast application 162. The operation of the JIMA 164 will be described in more detail below.

The memory 112 stores a variety of data 170, including sensor data acquired by the plurality of sensors 120, including sensor data acquired by the biometric sensor 122, sensor data acquired by the motion sensor 124 (i.e. accelerometer, gyroscope, or inertial measurement unit (IMU) of the computing device 102), sensor data acquired by the infrared sensor 126, and sensor data acquired by the proximity sensor 128. The memory 112 also stores input data 172 acquired by the touchscreen 138 and/or other input devices 142, user data including user preferences, settings and possibly biometric data about the user for authentication and/or identification, a download cache including data downloaded via the wireless transceivers, and saved files. System software, software modules, specific device applications, or parts thereof, may be temporarily loaded into RAM 108. Communication signals received by the computing device 102 may also be stored in RAM 108. Although specific functions are described for various types of memory, this is merely one embodiment, and a different assignment of functions to types of memory may be used in other embodiments.

The computing device 102 may also comprise a battery (not shown) as a power source, such as one or more rechargeable batteries that may be charged, for example, through charging circuitry coupled to a battery interface such as the serial data port. The battery provides electrical power to at least some of the components of the computing device 102, and the battery interface (not shown) provides a mechanical and electrical connection for the battery.

Figure 3:
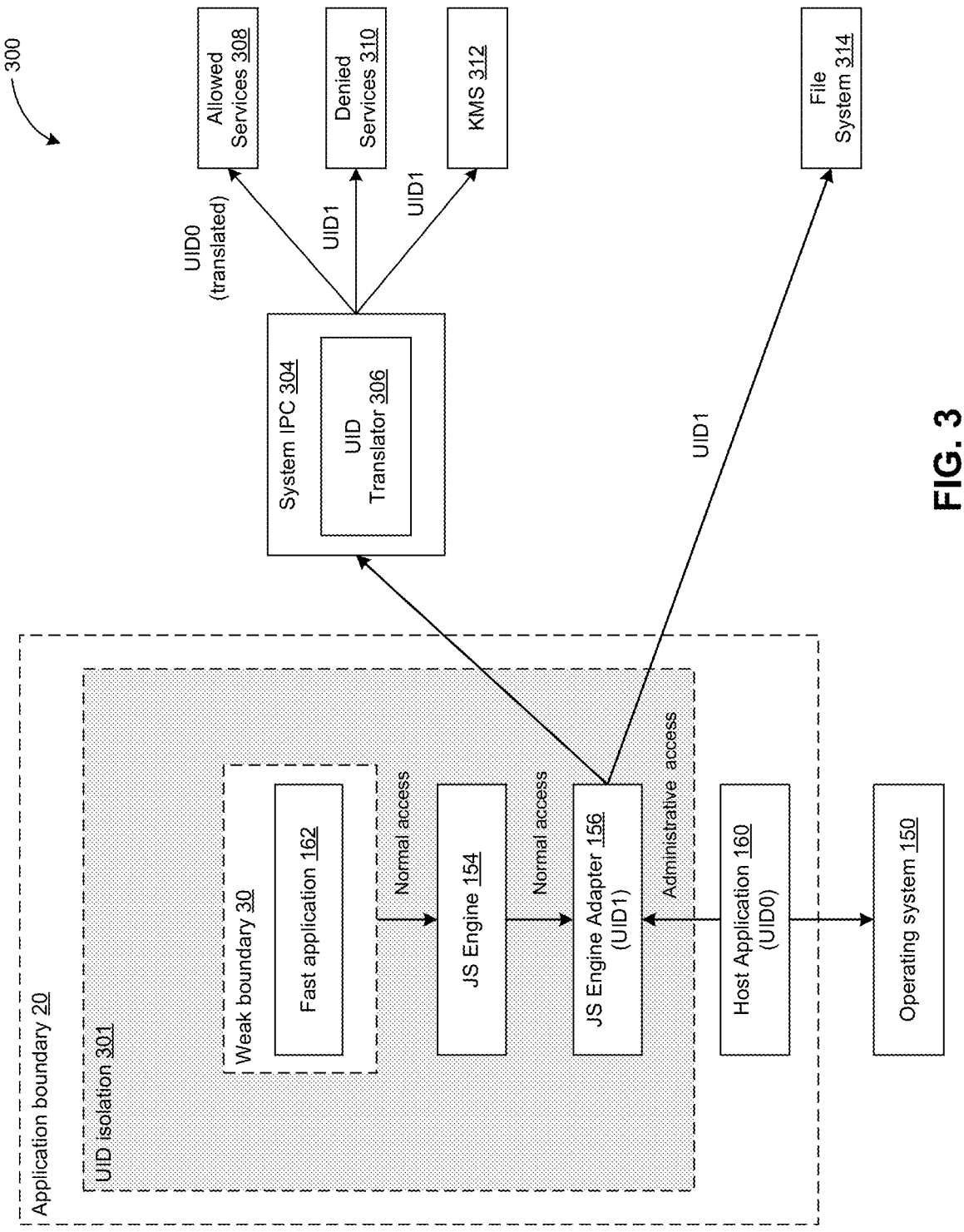
FIG. 3 is a block diagram illustrating software architecture in accordance with a first embodiment of the present disclosure.

FIG. 3 is a block diagram illustrating a software architecture 300 in accordance with one embodiment of the present disclosure. A host application 160 on the computing device 102 with communicates with the operating system 150 to access resources such as user data, hardware, file systems, key configuration data and cryptographic materials, during execution. The host application 160 operates within a logical application boundary 20. The host application has at least one fast application 162. The fast application 162 has a corresponding instance of the JavaScript engine 154 and JavaScript engine adapter 156. The fast application 162 operates within a weak logical application boundary 30.

The operating system 150, as part of the application installation process, assigns a user identifier (UID) to each application 158. The user identifier is used by the operating system 150 to associate, evaluate and execute instructions from each application 158, for example, when granting access to resources of the computing device 102. The JavaScript engine adapter 156 of the fast application 162 is assigned a unique UID different from the UID of the host application 162 during the installation process of the fast application 162. In the shown example, the host application 160 is assigned UID0 and the JavaScript engine adapter 156 of the fast application 162 is assigned UID1. Conventionally, A JavaScript engine adapter 156 could not be assigned a UID. Instead, the JavaScript engine adapter 156 would use the UID of the host application 160. The assignment of a UID to the JavaScript engine adapter 156 of the fast application 162 is referred to as UID isolation, shown as a logical boundary in FIG. 3 by reference number 301. UID isolation aims to prevent the JavaScript engine adapter 156 from having the same set of privileges and permissions as that of the host application 160 to at least partially secure the host application 160 in the event that the JavaScript engine adapter 156 is compromised. On POSIX (Portable Operating System Interface) and POSIX-like systems, UID is one of the main instruments for program isolation. POSIX and POSIX-like systems are operating systems that follow the portable operating system interface standard. An application, such as the host application 160 or the fast application 162, can access only resources allowed by the operating system 150 for the UID of the application.

Moreover, on mobile systems each UID is also associated with a set of user-granted permissions dictating which system services (such as hardware sensors) and cryptographic resources (such as encryption keys) the application can have access to. Because the host application 160 may have to support a wide variety of fast applications 162 and act as an administrator for all of the fast applications 162, the host application 160 may acquire a much richer set of permissions from the user and have access to key configuration data related to all installed fast applications 1262. By allowing the JavaScript engine adapter 156 to have the same UID as the host application as is conventionally done, there is a risk that these permissions are given to a malicious fast application 162 after it has taken control of the JavaScript engine adapter 156.

The JavaScript engine adapter 156 requests access to system services through system inter-process communication (IPC) 304 or the file system through system calls. The system IPC 304 manages shared data of the operating system 150. The assignment of a unique UID to the JavaScript engine adapter 156 changes how system services or the kernel perceives the identity of the JavaScript engine adapter 156 when processing requests. This may result in a denial of access as the identity (e.g., UID) associated with the request may not possess the required permission for a request. This result is desirable in most cases because it isolates the JavaScript engine adapter 156. However, in some cases the denial of service is not desirable. A UID translator 306 is provide to reduce or eliminate unwanted denials of service. The UID translator 306 is part of the operating system 150. The UID translator 306 may be part of the system IPC 304 in some embodiments as shown. The UID translator 306 selectively translates (transforms) the UID of the JavaScript engine adapter 156 to the UID of the host application 160 to grant the permissions of the host application 160 to the JavaScript engine adapter 156 on a per request basis. The UID translator 306 selectively translates the UID of the JavaScript engine adapter 156 based on a permission list of the fast application 162 (which is part of the configuration data available only to the administrator) and the destination of the request. The permission list identifies resources, such as services of the operating system 150, that a particular fast application 162 has been granted. The permissions depend on the operating system 150. For example, the permissions may include a full set, or a subset, of the operating system 150, such a full set or a subset of the Android™ permissions. Examples of permissions include read/write device storage, access coarse/fine location, access camera, access microphone, access internet, read/write contacts, and read/write calendar.

For allowed services 308 that the fast application 162 is allowed to access based on the permission list of the fast application 162, the UID translator 306 translates the UID of the JavaScript engine adapter 156 to the UID of the host application 160, thereby allowing the request to succeed.

For denied services 310 that the fast application 162 is not allowed to access based on the permission list of the fast application 162, the UID translator 306 does not translate the UID of the JavaScript engine adapter 156 to the UID of the host application 160, thereby denying the request.

For key management service (KMS) 312, the UID translator 306 does not translate the UID of the JavaScript engine adapter 156 to the UID of the host application 160, thereby denying the request. In this event, the fast application 162 is recognized as a unique client to KMS to prevent cross-client access to the key configuration data and cryptographic materials stored in KMS 312.

For file system access 314, the UID translator 306 does not translate the UID of the JavaScript engine adapter 156 back to the UID of the host application 160, thereby denying the request. In this event, the fast application can only access private files owned by the UID of the JavaScript engine adapter 156.

Using UID isolation as described above, a malicious fast application 162 may break out of the JavaScript engine containments and be able to manipulate the JavaScript engine adapter 156 to subvert any checks that it enforces. However, malicious fast application 162 will not be able to get the privileges and permissions of the host application 160 since the UID of the JavaScript engine adapter 156 is different from the UID of the host application 160. By separating the UID of the JavaScript engine adapter 156 from the UID of the host application 160, a compromised JavaScript engine adapter 156 will still be recognized by the operating system 150 but as a different application from the host application 160, thus preventing the malicious fast application 162 from accessing resources the host application 160 is entitled to.

Figure 4:
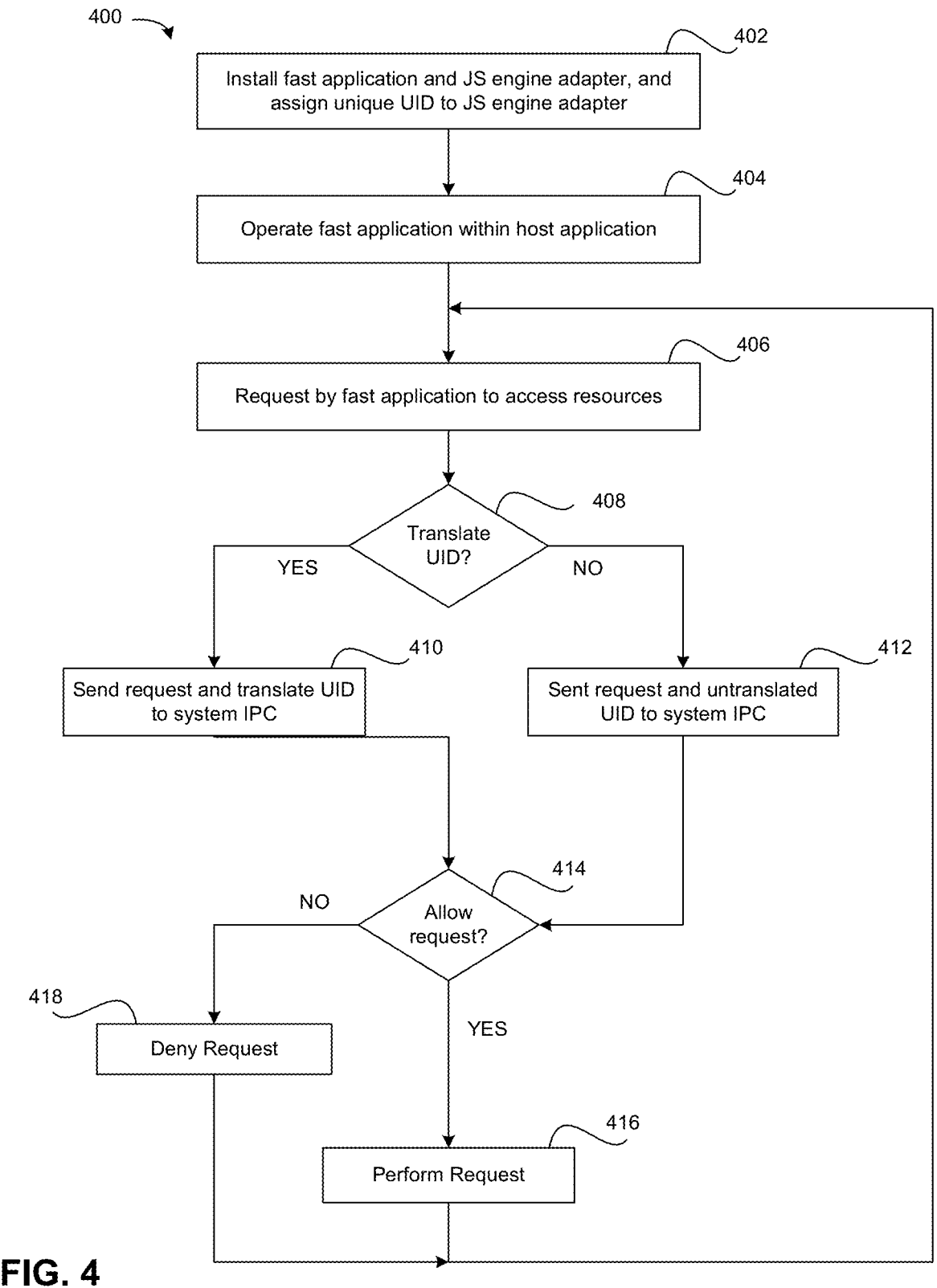
FIG. 4 is a flowchart of a method for enforcing application security on a computing device in accordance with a first embodiment of the present disclosure.

FIG. 4 is a flowchart of a method 400 for enforcing application security on a computing device in accordance with a first embodiment of the present disclosure. At least parts of the method 400 are carried out by software executed by the processor 104 of the computing device 102. The computing device 102 has a number of applications 158 installed, including a host application 160 having a unique UID (UID0 in the shown example).

At operation 402, a fast application 162 is installed on the computing device 102 along with a JavaScript engine adapter 156 for the fast application 162. During the installation process, the JavaScript engine adapter 156 of the fast application 162 is assigned a unique UID different from the UID of the host application 160. The fast application 162 may be received from external sources through download for installation.

At operation 404, the fast application 162 is launched, run, executed or operated within the host application 160.

At operation 406, the fast application 162 requests access to resources of the computing device 102 via the JavaScript engine adapter 156. The resources may be user data, hardware, file systems, key configuration data and cryptographic materials or other resources.

At operation 408, the UID translator 306 determines whether to translate the UID of the JavaScript engine adapter 156 to the UID of the host application 160 based on a permission list of the fast application 162 and the destination of the request as described above.

At operation 410, in response to a determination that the request is associated with resources included in a permission list of the fast application, the operating system 150 translates the UID of the JavaScript engine adapter 156 to the UID of the host application 160 via the UID translator 306, and the request and the translated UID (the host application, UID0 in the shown example) is sent to the system IPC 304 which determines whether to allow the request based on the translated UID.

At operation 412, in response to a determination that the request is associated with resources not included in the permission list of the fast application, the request is associated with a key management service, or the request is associated with a file system, the operating system 150 refrains from translating the UID of the JavaScript engine adapter 156 to the UID of the host application, and the request and the UID of the JavaScript engine adapter 156 (UID1 in the shown example) is sent to the system IPC which determines whether to allow the request based on the UID of the JavaScript engine adapter 156.

At operation 414, the system IPC determines whether to allow the request based on the UID of the JavaScript engine adapter 156 or the host application 160, as the case may be. At operation 416, the system IPC 304 performs the requested in response to a determination to allow the request. At operation 418, the system IPC 304 returns an error or denial message to the fast application 162 in response to a determination to deny the request. The error or denial message is a system IPC but the system message may trigger an onscreen message to a user of the computing device 102. Typically, the error or denial message is handled by the host application 160 (such as the java.lang.SecurityError on Android™) which may display an error dialog or message indicating an access denied error.

Figure 5:
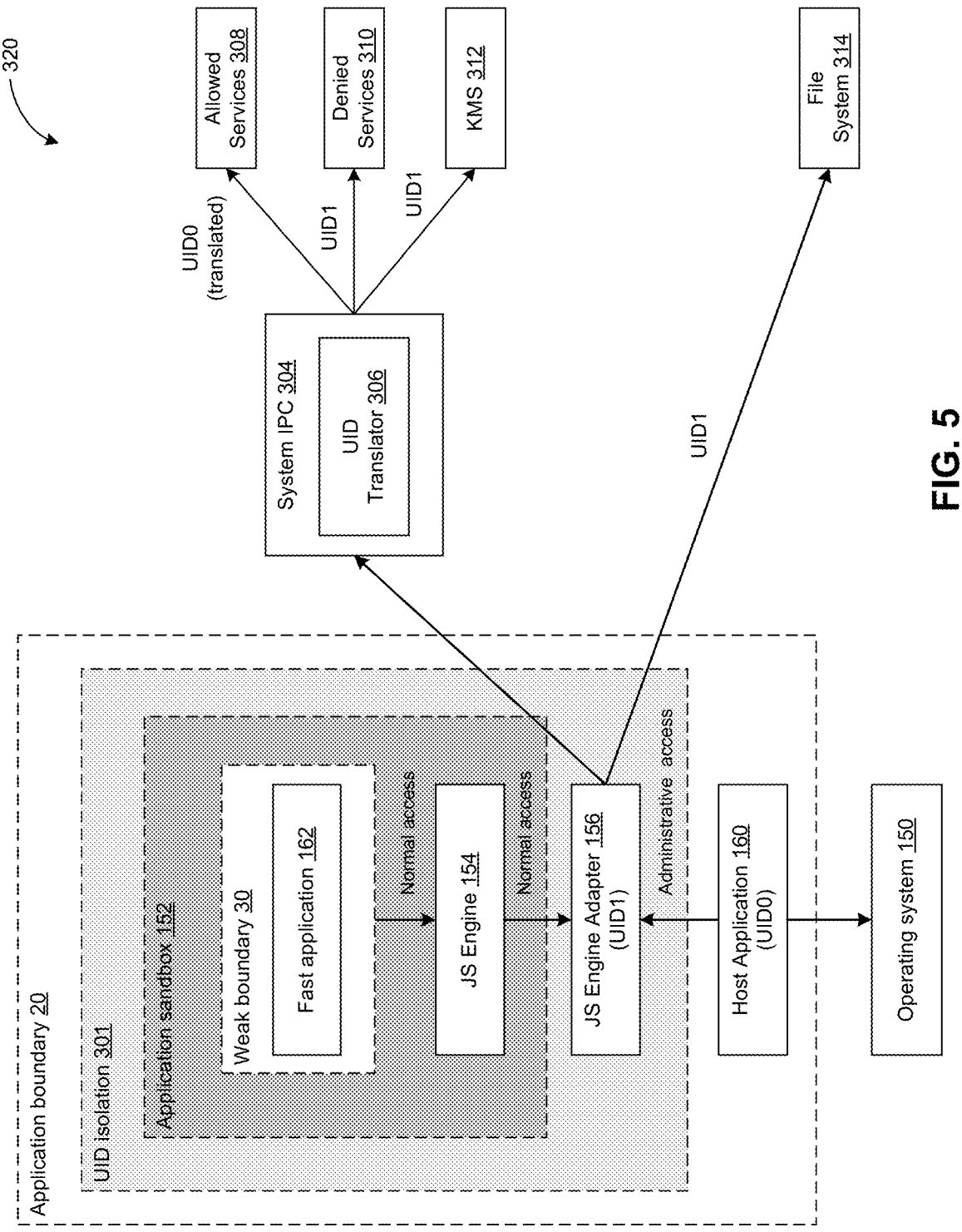
FIG. 5 is a block diagram illustrating software architecture in accordance with a second embodiment of the present disclosure.

FIG. 5 is a block diagram illustrating a software architecture 320 in accordance with a second embodiment of the present disclosure. The software architecture 320 is similar to the software architecture 300 of FIG. 3 except that it further comprises privilege-less application sandbox isolation by way of a privilege-less application sandbox 152. The JavaScript engine 154 is isolated from the rest of the computing environment by the privilege-less application sandbox 152, which is generated by the JavaScript engine adapter 156 of the fast application 162. The implementation of the privilege-less application sandbox 152 is platform-dependent but for each platform the privilege-less application sandbox 152 provides a JavaScript runtime environment in which no external resource access is possible. The privilege-less application sandbox 152 allows untrusted JavaScript code of the fast application 162 and the JavaScript engine 154 to be safely executed. The privilege-less application sandbox 152 implements an isolated JavaScript environment that can be used to run any code without being able to escape the privilege-less application sandbox 152 which, in combination with the UID isolation, provides complete isolation of the untrusted code running inside the privilege-less application sandbox 152. The privilege-less application sandbox 152 may be implemented using isolated services of the operating system 150, such as the isolated services of Android™. Isolated services are executed using a special isolated process that is configured so that an isolated service cannot access any system service or resource, and can only communicate with the rest of the system through a system IPC channel with the host process that launched the isolated service.

The JavaScript engine adapter 156 generates a two-way channel to communicate with resources outside of the privilege-less application sandbox 152. The two-way channel is the only way for the fast application 162 to access resources outside of the privilege-less application sandbox 152. Any request to access resources external to the privilege-less application sandbox 152 is subject to permission checks enforced by the JavaScript engine adapter 156. Optionally, authorization by the user may be requested when there are insufficient permissions to allow the request. For example, rather than denying requests for which insufficient permissions exists, the user may be prompted to grant one or more required permissions associated with the request. The privilege-less application sandbox 152 provides a further barrier for a malicious fast application to break through before it can escalate privileges and permissions by taking over the JavaScript engine adapter 156.

Figure 6:
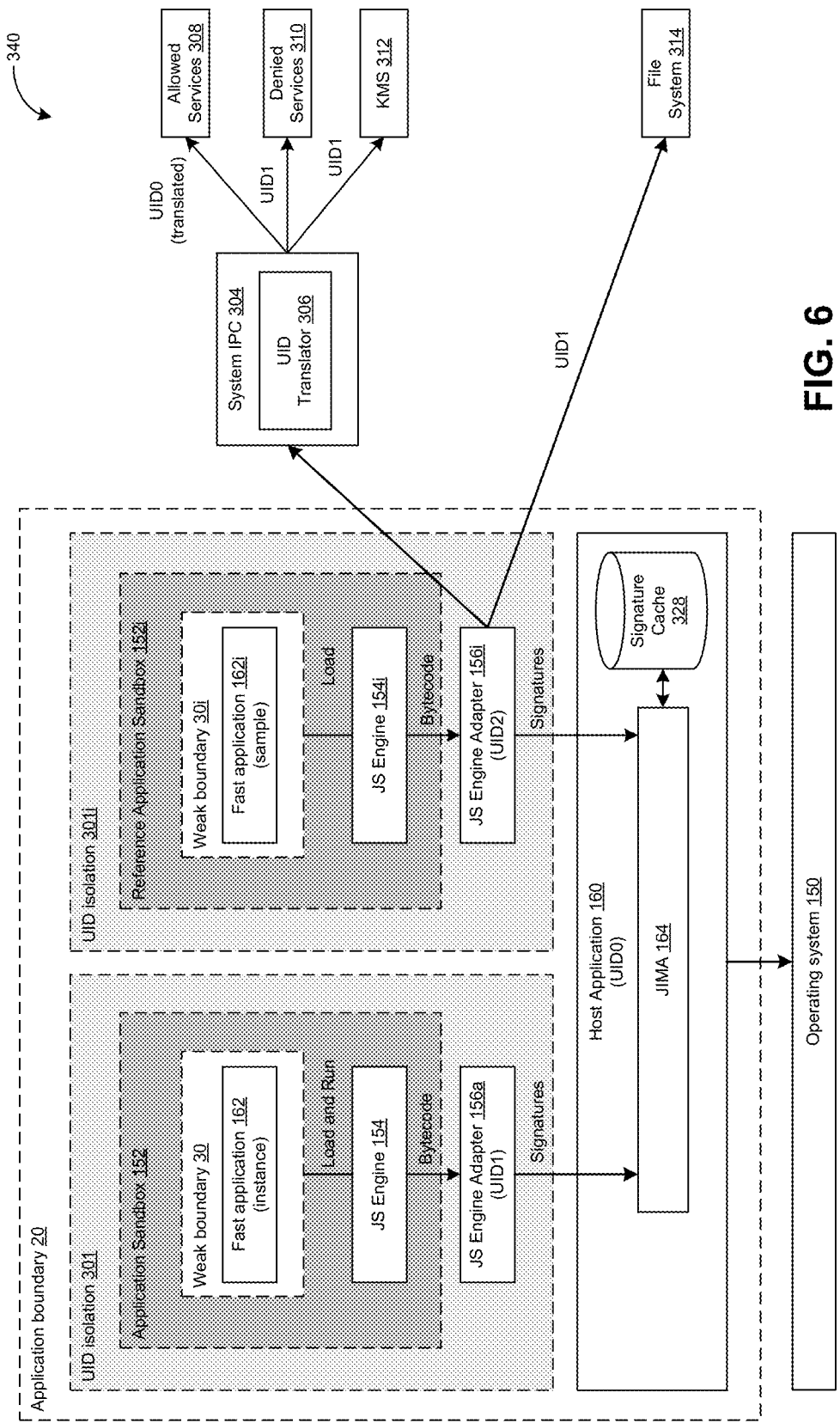
FIG. 6 is a block diagram illustrating software architecture in accordance with a third embodiment of the present disclosure.

FIG. 6 is a block diagram illustrating a software architecture 340 in accordance with a third embodiment of the present disclosure. The software architecture 340 is similar to the software architecture 320 of FIG. 5 except that it provides a scripting language integrity measurement agent such as the JIMA 164. The JIMA 164 periodically monitors the integrity of JavaScript code at runtime to detect tamper or self-morphing behavior. The JIMA 164 is typically part of the operating system 150 may but may be part of the host application 160.

The JIMA 164 uses a reference version of the fast application 162 running in a JIMA reference privilege-less application sandbox 152i, identified by the reference 162i. When the fast application 162 is about to launch, the JIMA 164 loads the JavaScript code into the JIMA reference privilege-less application sandbox 152i without running it (executing its code). The JIMA reference privilege-less application sandbox 152i is used to compile the code and generate reference hash signatures of the functions in it as described herein. The reference fast application 162i may be provided with UID isolation, shown as a logical boundary in FIG. 6 by reference number 301i. Similar to the fast application 162, the reference fast application 162i is loaded within a weak logical boundary 30i within the application boundary 120 of the host application 160. Although the reference fast application 162i is not run, it has an associated instance of the JavaScript engine 154i and the JavaScript engine adapter 156i. A signature cache 328, which may be part of the host application 160 or accessible to the host application 160, stores cryptographic signatures as described below.

Within the JIMA reference privilege-less application sandbox 152i, compiled bytecode of the reference fast application 162i is obtained from the JS JavaScript engine 154i and a cryptographic signature (also referred to as a hash) of the compiled bytecode is generated using a cryptographic hash function such as SHA-256 (Secure Hash Algorithm 256) on each bytecode section. Instead of computing a single cryptographic signature from the entire bytecode for the reference fast application 162i, one cryptographic signature is generated for each dividable section of bytecode so that if the order of the bytecode sections is shuffled later (which may happen depending on the dynamics of the JavaScript engine), the cryptographic signature can still be used. Each compiled JavaScript function is considered a dividable section of bytecode in some examples. By using JavaScript functions as a minimum dividable section of bytecode, that the order in which functions are called does not impact the solution. Thus, one cryptographic signature (or hash) is generated for each dividable section of bytecode, e.g., each JavaScript function.

The cryptographic signatures are stored in the signature cache 328. When the fast application 162 is running, cryptographic signatures are periodically generated from the regular application privilege-less application sandbox 152 based on each dividable section of bytecode and compared against the cryptographic signatures in the signature cache to detect any change in the bytecode. During comparison, each cryptographic signature of the running fast application 162 is compared in order of appearance in the code fast application 162 against the cryptographic signatures are stored in the signature cache 328 until a match is found or all cryptographic signatures are stored in the signature cache 328 have been attempt and no match is found in which case a mismatch is determined to exist. A mismatch implies that the fast application 162 has changed its source code and could be a malicious fast application 162. The interval or frequency of the periodic check can be tuned to balance security and performance overhead. For example, the check may be performed once, at the start, each time the application is run, every several minutes, every minute, or possible a few times per minute. In response to detection of a mismatch between the collected signatures and the cached signatures, the JIMA 164 may send a request or instructions to the operating system 150 to terminate the fast application 162. The JIMA 164 may notify the user of the mismatch in addition to, or instead, of terminating the instructions to the operating system 150 to terminate the fast application 162.

Because the cryptographic signatures are generated at the bytecode level, the JIMA 164 can detect any manipulation in the code of the fast application 162, which may not be detected by simple static analysis based on source code only. Another advantage over static analysis is that the JIMA module checks the code at runtime. Therefore, it can detect tamper or self-morphing behaviour after the fast application 162 has been installed. Static analysis, on the other hand, does only one-time checks.

Figure 7:
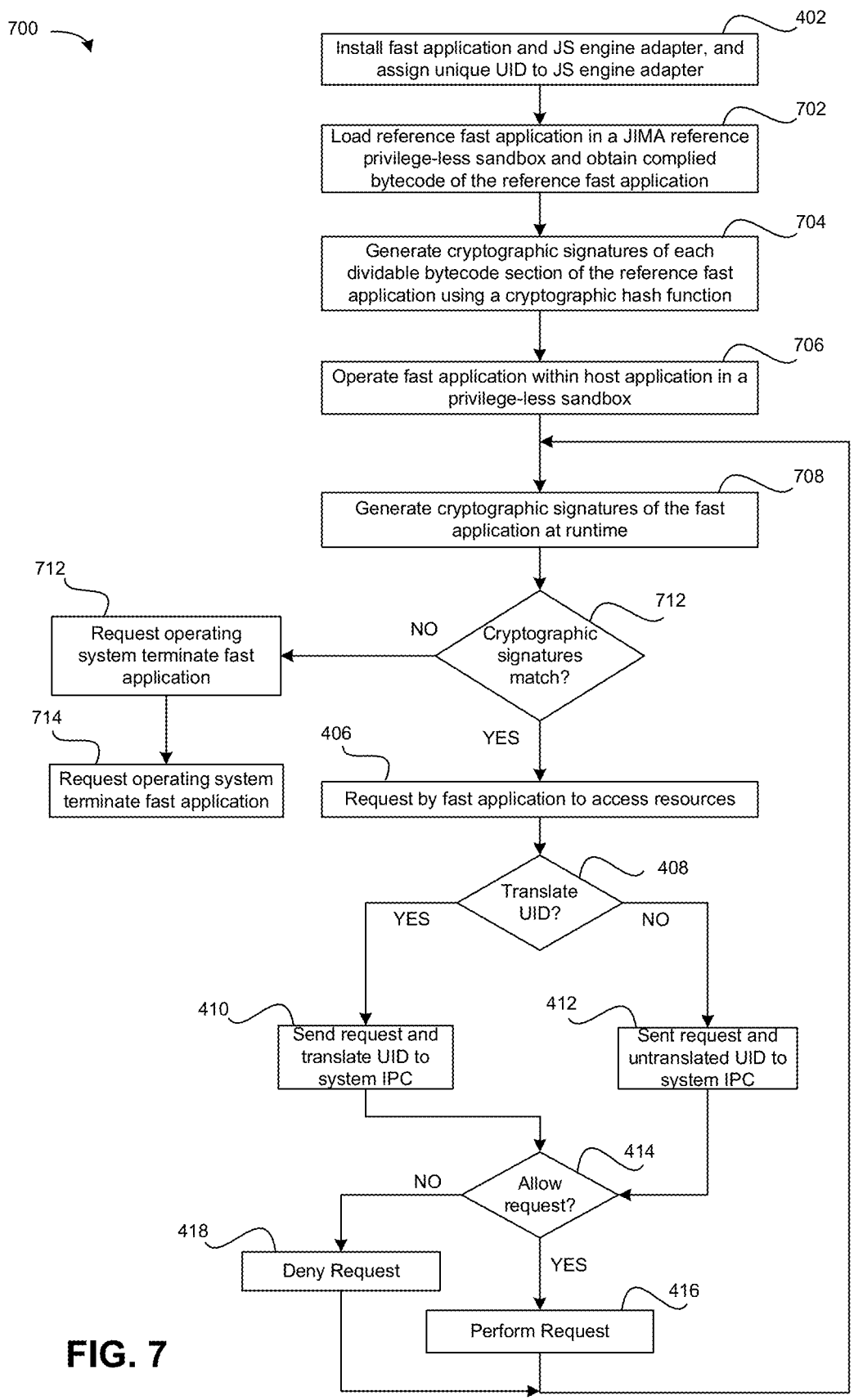
FIG. 7 is a flowchart of a method for enforcing application security on a computing device in accordance with a third embodiment of the present disclosure.

FIG. 7 is a flowchart of a method 700 for enforcing application security on a computing device in accordance with a third embodiment of the present disclosure. At least parts of the method 700 are carried out by software executed by the processor 104 of the computing device 102. The method 700 is similar in several respects to the method 400 except that it includes the additional operations of a scripting language integrity measurement agent (e.g., JIMA 164) described above.

At operation 402, a fast application 162 is installed on the computing device 102 along with a JavaScript engine adapter 156 for the fast application 162. During the installation process, the JavaScript engine adapter 156 of the fast application 162 is assigned a unique UID different from the UID of the host application 160. The fast application 162 may be received from external sources through download for installation.

At operation 702, before the fast application 162 is launched, run, executed or operated within the host application 160, a reference fast application 162i is loaded within a JIMA reference privilege-less application sandbox 152i but not operated (e.g., not run), and complied bytecode of the reference fast application 162i is obtained by the JIMA 164.

At operation 704, a cryptographic signature of each dividable section of bytecode of the compiled bytecode of the reference fast application 162i is generated by the JIMA 164 using a cryptographic hash function before the fast application 162 is first launched, run, executed or operated within the host application 160. The cryptographic signatures are stored in the signature cache 328. The signature cache 328 can be generated during the installation of the fast application 162. Alternatively, the signature cache 328 can be generated at first launch.

At operation 706, the fast application 162 is launched, run, executed or operated within the host application 160 within the privilege-less application sandbox 152.

At operation 708, a cryptographic signature of the bytecode of the fast application 162 at runtime is generated by the JIMA 164.

At operation 710, the JIMA 164 compares the cryptographic signatures of the bytecode of the fast application 162 at runtime to the cryptographic signatures of the bytecode of the reference fast application 162i stored in the signature cache 328 and determines whether the corresponding cryptographic signatures match.

A security action is performed in response to determination of a mismatch between the cryptographic signatures of the bytecode of the fast application at runtime and the cryptographic signatures of the bytecode of the reference fast application stored in the signature cache 328. The nature of the security action may be selected to balance security and performance overhead. In the shown example, at operation 712 the JIMA 164 may send a request or instructions to the operating system 150 to terminate the fast application 162 in response to determination of a mismatch between the cryptographic signatures of the bytecode of the fast application at runtime and the cryptographic signatures of the bytecode of the reference fast application stored in the signature cache 328. The operating system 150 may automatically terminate the fast application 162 in response to receiving the request or instructions from the JIMA 164. At operation 714, the JIMA 164 may notify the user of the mismatch in response to determination of a mismatch between the cryptographic signatures of the bytecode of the fast application at runtime and the cryptographic signatures of the bytecode of the reference fast application stored in the signature cache 328. User notification may be an onscreen notification that is displayed on a display of the computing device 102 such as the touchscreen 138, for example, as part of, or overlaying, a visual interface screen of the host application 160 in which the fast application 162 operates. The operation 714 may be performed in addition to, or instead, of terminating the instructions to the operating system 150 to terminate the fast application 162. For example, the user may be presented with a prompt displayed on the display of the computing device 102 which provides options regarding to proceed, i.e. terminate the fast application 162 or proceed with the fast application 162.

The operations 708-714 may be performed in a response to a timer to ensure that a check is periodically performed.

Operations 406-418 from the method 400 are then performed. Alternatively, the operations 406-418 may be performed before the operations 708-714.

Although the above-described embodiments make use of a JavaScript Engine, it will be appreciated that the teachings of the present disclosure may be extended to other scripting languages, other scripting engines and other application adapters having similar functionality.

General

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified, as appropriate.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, central processing units (CPUs), neural processing units (NPUs), tensor processing units (TPUs), hardware accelerators, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method for enforcing application security on a computing device, comprising:
   receiving, by an operating system of the computing device from an application adapter of a fast application operating within a host application on the computing device, a request to access resources of the computing device, wherein the host application and application adapter are each associated with a unique user identifier (UID);
   in response to a determination that the request is associated with resources included in a permission list of the fast application:
      translating, by the operating system, the UID of the application adapter to the UID of the host application; and
      determining, by the operating system, whether to allow the request based on the UID of the host application;
   in response to a determination that the request is associated with resources not included in the permission list of the fast application, the request is associated with a key management service, or the request is associated with a file system:
      refraining, by the operating system, from translating the UID of the application adapter to the UID of the host application; and
      determining, by the operating system, whether to allow the request based on the UID of the application adapter.

2. The method of claim 1, further comprising:
   performing the request in response to a determination to allow the request.

3. The method of claim 1, wherein the fast application and scripting engine for executing the fast application are operated within a privilege-less application sandbox, wherein access to resources of the computing device outside of the privilege-less application sandbox are controlled by the application adapter.

4. The method of claim 3, wherein the privilege-less application sandbox provides a runtime environment in which access to resources of the computing device outside of the privilege-less application sandbox are controlled by the application adapter through a two-way channel.

5. The method of claim 3, wherein the fast application is a JavaScript application, the scripting engine is a JavaScript engine, and the application adapter is a JavaScript engine adapter.

6. The method of claim 3, further comprising:
   before operating the fast application:
      loading a reference fast application within a reference privilege-less application sandbox and obtaining a complied bytecode of the reference fast application;
      generating cryptographic signatures for dividable sections of bytecode of the reference fast application using a cryptographic hash function, wherein a cryptographic signature is generated for each of the dividable sections of the compiled bytecode of the reference fast application; and
      storing the cryptographic signatures in a signature cache;
   periodically during the operating the fast application:
      generating cryptographic signatures for dividable sections of the bytecode of the fast application at runtime using the cryptographic hash function, wherein a cryptographic signature is generated for each of the dividable sections of the bytecode of the fast application at runtime;
      determining whether the cryptographic signatures of the bytecode of the fast application at runtime match the cryptographic signatures of the bytecode of the reference fast application stored in the signature cache; and
      performing a security action in response to determination of a mismatch between the cryptographic signatures of the bytecode of the fast application at runtime and the cryptographic signatures of the bytecode of the reference fast application stored in the signature cache.

7. The method of claim 6, wherein the security action comprises terminating the fast application.

8. The method of claim 6, wherein the security action comprises generating user notification.

9. The method of claim 8, wherein the user notification is an onscreen notification displayed on a display of the computing device.

10. The method of claim 9, wherein the onscreen notification is part of, or overlays, a visual interface screen of the host application in which the fast application operates.

11. The method of claim 1, wherein each UID is associated with a set of permissions to access resources of the computing device, wherein the UID of the host application is granted more permissions than the UID of the application adapter.

12. A computing device, comprising:
   a memory having tangibly stored thereon executable instructions; and
   a processor, in response to execution of the executable instructions, being configured to:
      receive, by an operating system of the computing device from an application adapter of a fast application operating within a host application on the computing device, a request to access resources from a fast application operating within a host application, wherein the host application and application adapter are each associated with a unique user identifier (UID);
      in response to a determination that the request is associated with resources included in a permission list of the fast application:
         translate, by the operating system, the UID of the application adapter to the UID of the host application; and
         determine, by the operating system, whether to allow the request based on the UID of the host application;

in response to a determination that the request is associated with resources not included in the permission list of the fast application, the request is associated with a key management service, or the request is associated with a file system:
  refrain, by the operating system, from translating the UID of the application adapter to the UID of the host application; and
  determine, by the operating system, whether to allow the request based on the UID of the application adapter.

13. The computing device of claim 12, wherein the processor is further configured to:
  perform the request in response to a determination to allow the request.

14. The computing device of claim 12, wherein the fast application and scripting engine for executing the fast application are operated within a privilege-less application sandbox, wherein access to resources of the computing device outside of the privilege-less application sandbox are controlled by the application adapter.

15. The computing device of claim 14, wherein the privilege-less application sandbox provides a runtime environment in which access to resources of the computing device outside of the privilege-less application sandbox are controlled by the application adapter through a two-way channel.

16. The computing device of claim 14, wherein the fast application is a JavaScript application, the scripting engine is a JavaScript engine, and the application adapter is a JavaScript engine adapter.

17. The computing device of claim 14, wherein the processor is further configured to:
  before operating the fast application:
    load a reference fast application within a reference privilege-less application sandbox and obtaining a complied bytecode of the reference fast application;
    generate cryptographic signatures for dividable sections of bytecode of the reference fast application using a cryptographic hash function, wherein a cryptographic signature is generated for each of the dividable sections of the compiled bytecode of the reference fast application; and
    store the cryptographic signatures in a signature cache;
  periodically during the operating the fast application:
    generate cryptographic signatures for dividable sections of the bytecode of the fast application at runtime using the cryptographic hash function, wherein a cryptographic signature is generated for each of the dividable sections of the bytecode of the fast application at runtime;
    determine whether the cryptographic signatures of the bytecode of the fast application at runtime matches the cryptographic signatures of the bytecode of the reference fast application stored in the signature cache; and
    perform a security action in response to determination of a mismatch between the cryptographic signatures of the bytecode of the fast application at runtime and the cryptographic signatures of the bytecode of the reference fast application stored in the signature cache.

18. The computing device of claim 17, wherein the security action comprises terminating the fast application.

19. The computing device of claim 17, wherein the security action comprises generating user notification.

20. A non-transitory machine readable medium having tangibly stored thereon executable instructions for execution by a processor of a computing device, wherein the executable instructions, in response to execution by the processor, cause the computing device to:
  receive, by an operating system of the computing device from an application adapter of a fast application operating within a host application on the computing device, a request to access resources from a fast application operating within a host application, wherein the host application and application adapter are each associated with a unique user identifier (UID);
  in response to a determination that the request is associated with resources included in a permission list of the fast application:
    translate, by the operating system, the UID of the application adapter to the UID of the host application; and
    determine, by the operating system, whether to allow the request based on the UID of the host application;
  in response to a determination that the request is associated with resources not included in the permission list of the fast application, the request is associated with a key management service, or the request is associated with a file system:
    refrain, by the operating system, from translating the UID of the application adapter to the UID of the host application; and
    determine, by the operating system, whether to allow the request based on the UID of the application adapter.

* * * * *